United States Patent
Kobayashi

(10) Patent No.: US 10,119,617 B2
(45) Date of Patent: Nov. 6, 2018

(54) SEALING DEVICE

(71) Applicant: NOK CORPORATION, Tokyo (JP)

(72) Inventor: Naoto Kobayashi, Fukushima (JP)

(73) Assignee: NOK CORPORATION, Tokyo (JP)

(*) Notice: Subject to any disclaimer, the term of this patent is extended or adjusted under 35 U.S.C. 154(b) by 0 days.

(21) Appl. No.: 15/328,959

(22) PCT Filed: Jul. 30, 2015

(86) PCT No.: PCT/JP2015/071578
§ 371 (c)(1),
(2) Date: Jan. 25, 2017

(87) PCT Pub. No.: WO2016/021473
PCT Pub. Date: Feb. 11, 2016

(65) Prior Publication Data
US 2017/0211705 A1    Jul. 27, 2017

(30) Foreign Application Priority Data
Aug. 4, 2014 (JP) .................................. 2014-158620

(51) Int. Cl.
*F16J 15/32* (2016.01)
*F16J 15/52* (2006.01)
(Continued)

(52) U.S. Cl.
CPC .............. *F16J 15/52* (2013.01); *F16J 3/043* (2013.01); *F16J 15/3224* (2013.01); *F16J 15/3232* (2013.01)

(58) Field of Classification Search
CPC .. F16J 15/52; F16J 15/3232; F16J 3/04; F16J 3/041; F16J 3/042; F16J 3/043; F16J 3/048
See application file for complete search history.

(56) References Cited

U.S. PATENT DOCUMENTS 3,372,076 A * 3/1968 Wilkinson ............... F16J 15/36
                                                     138/121
2008/0203673 A1   8/2008 Kanzaki et al.

FOREIGN PATENT DOCUMENTS

CN   101080590 A    11/2007
JP   S60-171941 U   11/1985
(Continued)

OTHER PUBLICATIONS

Chinese Office Action dated Sep. 4, 2017 with English translation (corresponding to CN 201580040365.X).

*Primary Examiner* — Gilbert Y Lee
(74) *Attorney, Agent, or Firm* — Harness, Dickey & Pierce, P.L.C.

(57) ABSTRACT

A sealing device that can mitigate stress concentration in a bellows part when a shaft deviates as it rotates. The sealing device 100 includes a fixed part 110 fixed to an inner circumference of a shaft hole in a housing 200, a thin bellows part 120 extending from the fixed part 110 toward a surface of the shaft 300 in a bellows shape, and a sealing part 130 provided on a radially inner side of the bellows part 120. The bellows part 120 includes, on one side thereof, circumferentially alternating ridges 121 extending radially from outside to inside and grooves 122 extending radially from outside to inside, and on the other side, grooves 123 and ridges 124 that are exact backsides of the ridges 121 and grooves 122 on the one side, respectively. The bellows part 120 is formed to have a substantially equal thickness t over an entire circumference thereof.

1 Claim, 4 Drawing Sheets

(51) Int. Cl.
*F16J 15/3232* (2016.01)
*F16J 3/04* (2006.01)
*F16J 15/3224* (2016.01)

(56) References Cited

FOREIGN PATENT DOCUMENTS

| | | |
|---|---|---|
| JP | 2001-032946 A | 2/2001 |
| JP | 3122007 U | 6/2006 |
| JP | 2007-146932 A | 6/2007 |
| JP | 2010-216607 A | 9/2010 |

\* cited by examiner

SEALING DEVICE

CROSS-REFERENCE TO RELATED APPLICATIONS

This application is a National Stage of International Application No. PCT/JP2015/071578, filed Jul. 30, 2015 (now WO 2016/021473A1), which claims priority to Japanese Application No. 2014-158620, filed Aug. 4, 2014. The entire disclosures of each of the above applications are incorporated herein by reference.

FIELD

The present disclosure relates to a sealing device that has a thin bellows part.

BACKGROUND

Sealing devices that seal an annular gap between a housing and a shaft have hitherto been known. In some known sealing devices used in equipment where the shaft largely deviates relative to the housing, a sealing part is provided on a radially inner side of a thin bellows part so that the sealing part in contact with a shaft can follow the shaft as the shaft deviates (see PTL 1).

A sealing device according to such a prior art example will be described with reference to FIG. 7. FIG. 7 is part of a schematic cross-sectional view of the sealing device according to the prior art example. The sealing device 500 according to the prior art example shown in FIG. 7 includes a fixed part 510 fixed to an inner circumference of a shaft hole in a housing, a thin bellows part 520 extending from the fixed part 510 toward a shaft surface in a bellows shape, and a sealing part 530 provided on a radially inner side of the bellows part 520. The sealing part 530 makes slidable contact with an outer circumferential surface of the shaft. In the sealing device 500 according to this prior art example, when the shaft deviates, the sealing part 530 stays in tight contact with the shaft, while the bellows part 520 undergoes deformation to keep the sealing part 530 consistently in tight contact with the outer circumferential surface of the shaft, thereby to maintain the airtightness.

Nevertheless, there is an issue that the bellows part 520 may suffer cracks or splits because the shaft repeatedly deviates at the same time as it rotates. This will be explained with reference to FIG. 8. FIG. 8 is a schematic diagram of the sealing device 500 viewed from an axial direction when the shaft deviates as it rotates. In FIG. 8, reference numeral 500P indicates the position of an inner peripheral edge of the sealing part 520, while 500Q indicates an outer peripheral edge of the fixed part 510.

When the shaft deviates during rotation, the inner peripheral edge 500P of the sealing part 520 moves in a direction (direction of arrow A) in which it deviates from the outer peripheral edge 500Q of the fixed part 510 with the movement of the shaft in the deviating direction. At the same time, the inner peripheral edge is subjected to a force (torque) in a rotating direction (direction of arrow B) as the shaft rotates. The bellows part 520 is twisted because of this, and stress concentrates in some part thereof (part X in the drawing). Therefore, as the shaft repeatedly deviates and rotates at the same time, the stress concentration is repeated, which could result in cracks or splits. The partial twisting could also deteriorate the ability of the sealing part 520 to follow the shaft, or make the orientation of the sealing part 520 unstable, which may reduce the airtightness.

As described above, one of the important issues in sealing devices that have a thin bellows part is how to mitigate stress concentration in the bellows part.

CITATION LIST

Patent Literature

Japanese Patent Application Laid-open No. 2010-216607

SUMMARY

Technical Problem

An object of the present disclosure is to provide a sealing device that can mitigate stress concentration in a bellows part when a shaft deviates as it rotates.

Solution to Problem

The present disclosure adopted the following means to achieve the object noted above.

Namely, the sealing device of the present disclosure is a sealing device that seals an annular gap between a housing having a shaft hole, and a shaft configured to be inserted through the shaft hole and to rotate and deviate relative to the housing (including when the shaft moves while the housing is stationary, as well as when the shaft is stationary while the housing moves, and when both move).

The sealing device includes a fixed part fixed to an inner circumference of the shaft hole in the housing, a thin bellows part extending from the fixed part toward a surface of the shaft in a bellows shape, and a sealing part provided on a radially inner side of the bellows part and slidably contacting an outer circumferential surface of the shaft.

The bellows part includes, on one side thereof, circumferentially alternating ridges extending radially from outside to inside and grooves extending radially from outside to inside, and on the other side, grooves and ridges that are exact backsides of the ridges and grooves on the one side of the bellows part, respectively.

The bellows part is formed to have a substantially equal thickness over an entire circumference thereof.

According to the present disclosure, with the ridges and grooves provided on one side and the other side of the bellows part, respectively, the bellows part is corrugated in a bellows shape also in the circumferential direction, and has easily expandable and contractible properties in the circumferential direction. Therefore, partial twisting of the bellows part can be minimized even when the shaft deviates during rotation. Moreover, the bellows part has a substantially equal thickness over the entire circumference, so that it does not suffer a local decrease in strength. Accordingly, local stress concentration in the bellows part can be minimized.

Preferably, the ridges and grooves on the one side, and the grooves and ridges on the other side, all extend from an edge on a radially outer side to an edge on a radially inner side of the bellows part.

This way, partial twisting of the bellows part can be minimized over the entire bellows part.

Advantageous Effects of the Disclosure

As described above, according to the present disclosure, stress concentration in the bellows part when the shaft deviates as it rotates can be mitigated.

DRAWINGS

DETAILED DESCRIPTION

Modes for carrying out this disclosure will be hereinafter illustratively described in detail based on a specific embodiment with reference to the drawings. It should be noted that, unless otherwise particularly specified, the sizes, materials, shapes, and relative arrangement or the like of constituent components described in the embodiment are not intended to limit the scope of this disclosure.

(Embodiment)

Figure 1:
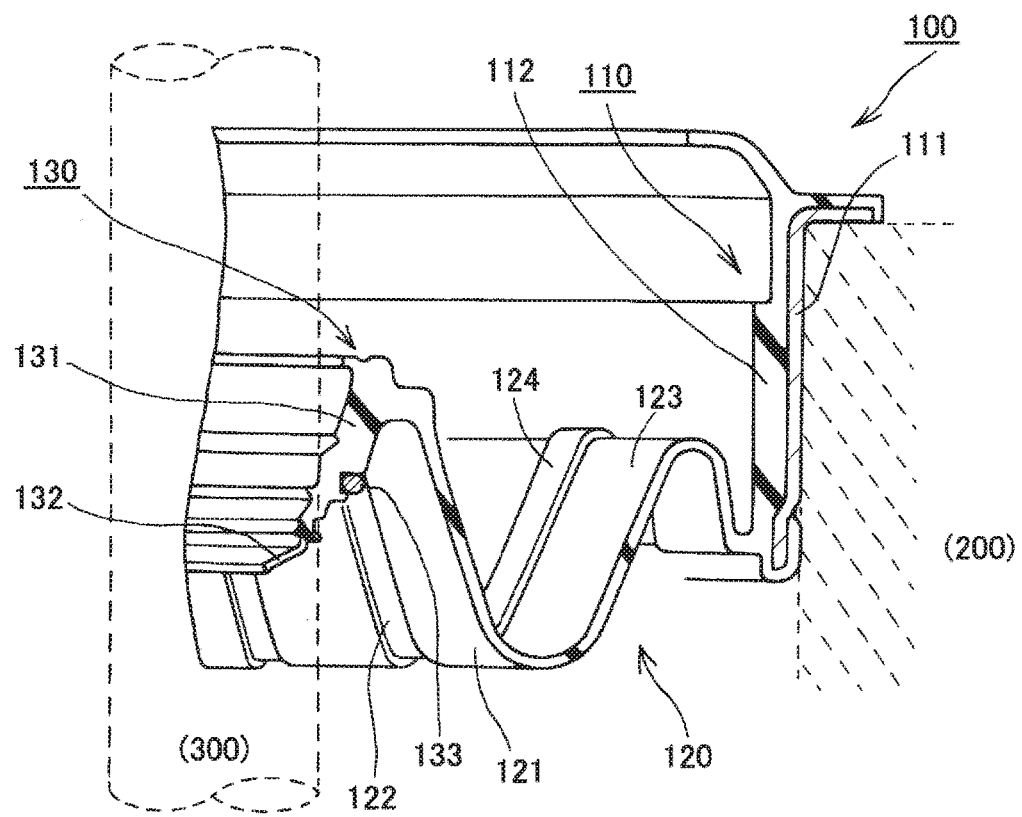
FIG. 1 is part of a schematic cross-sectional view of a sealing device according to one embodiment of the present disclosure.

The sealing device according to the embodiment of the present disclosure will be described with reference to FIG. 1 to FIG. 6. In the embodiment shown below, the sealing device will be described as a steering dust seal as one example. The steering dust seal is a seal that seals an annular gap between a housing having a shaft hole and a shaft configured to be inserted through this shaft hole, as with the prior art example described in the foregoing. As with the prior art example, the shaft is configured to rotate and rock (deviate relative to the housing). In FIG. 1, part above the sealing device will be the driver's seat side, while the part below will be the engine room side.

<Overall Configuration of the Sealing Device>

The overall configuration of the sealing device 100 according to this embodiment will be described with reference to FIG. 1 in particular. The sealing device 100 serves the function of sealing an annular gap between a housing 200 having a shaft hole, and a shaft 300 configured to be inserted through the shaft hole and to rotate and deviate relative to the housing 200. In FIG. 1, the housing 200 and shaft 300 are indicated with broken lines. FIG. 1 shows the sealing device 100 in a state before it is arranged in the annular gap, i.e., in a state where it is not subjected to any external forces.

The sealing device 100 according to this embodiment includes a fixed part 110 fixed to an inner circumference of the shaft hole in the housing 200, a thin bellows part 120 extending from this fixed part 110 toward a surface of the shaft 300 in a bellows shape, and a sealing part 130 provided on a radially inner side of the bellows part 120. This sealing part 130 includes a bumper 131 and a lip 132 configured to be slidable against an outer circumferential surface of the shaft 300. The fixed part 110 includes a metal reinforcing ring 111 and an outer circumferential elastic part 112 provided on the inner side of this reinforcing ring 111. A metal fastening ring 133 is provided around the outer circumference of the sealing part 130. This fastening ring 133 prevents the sealing part 130 from coming off of the outer circumferential surface of the shaft 300. The components of the sealing device 100 except for the reinforcing ring 111 and fastening ring 133, i.e., the outer circumferential elastic part 112, bellows part 120, bumper 131, and lip 132, are made of an elastic material such as rubber.

The bumper 131 of the sealing part 130 is formed thick so as to have high rigidity, so that the bumper does not undergo much deformation when the shaft 300 moves (rotates or deviates). Therefore, the lip 132 that is thin does not deform much either and is kept in stable contact with the shaft surface. As mentioned above, the fastening ring 133 further ensures that the lip 132 will not separate from the shaft 300. When the shaft 300 deviates, the bellows part 120 undergoes deformation, while the bumper 131 is kept in tight contact with the shaft 300 and does not deform itself. As mentioned above, the lip 132 is kept in stable contact with the shaft surface, too, so that the airtightness is maintained.

<Particulars of the Bellows Part>

Figure 2:
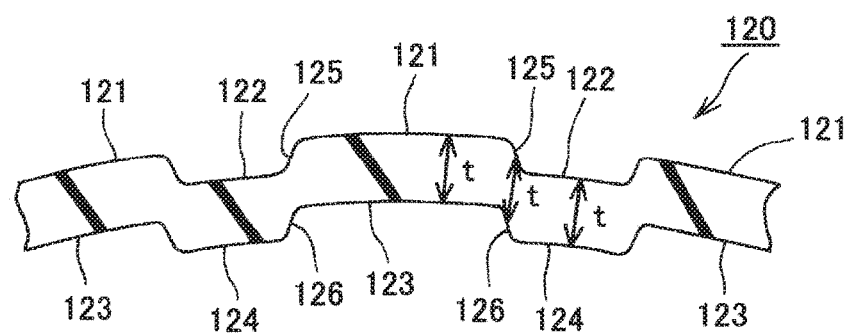
FIG. 2 is part of a schematic cross-sectional view of a bellows part in the sealing device according to the embodiment of the present disclosure.
Figure 3:
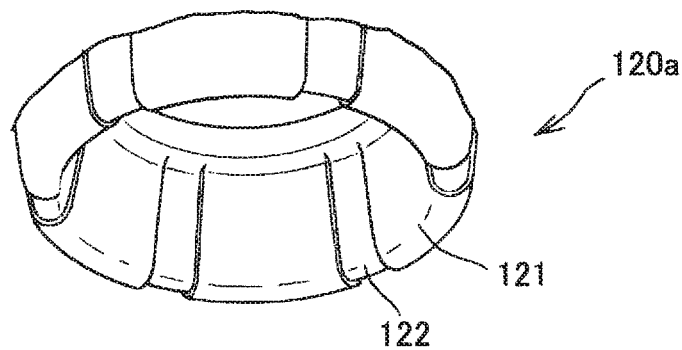
FIG. 3 is a perspective view illustrating an example of the bellows part in the sealing device according to the embodiment of the present disclosure.
Figure 4:
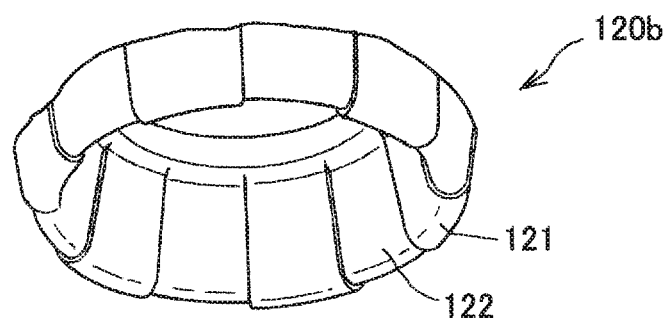
FIG. 4 is a perspective view illustrating an example of the bellows part in the sealing device according to the embodiment of the present disclosure.
Figure 5:
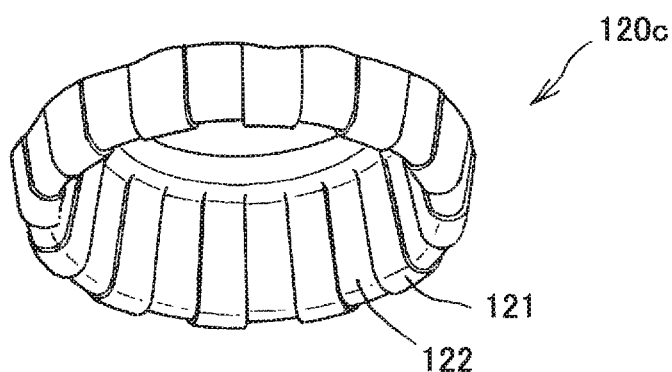
FIG. 5 is a perspective view illustrating an example of the bellows part in the sealing device according to the embodiment of the present disclosure.
Figure 6:
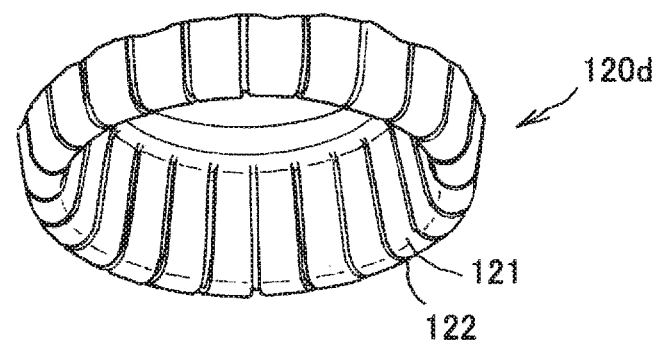
FIG. 6 is a perspective view illustrating an example of the bellows part in the sealing device according to the embodiment of the present disclosure.
Figure 7:
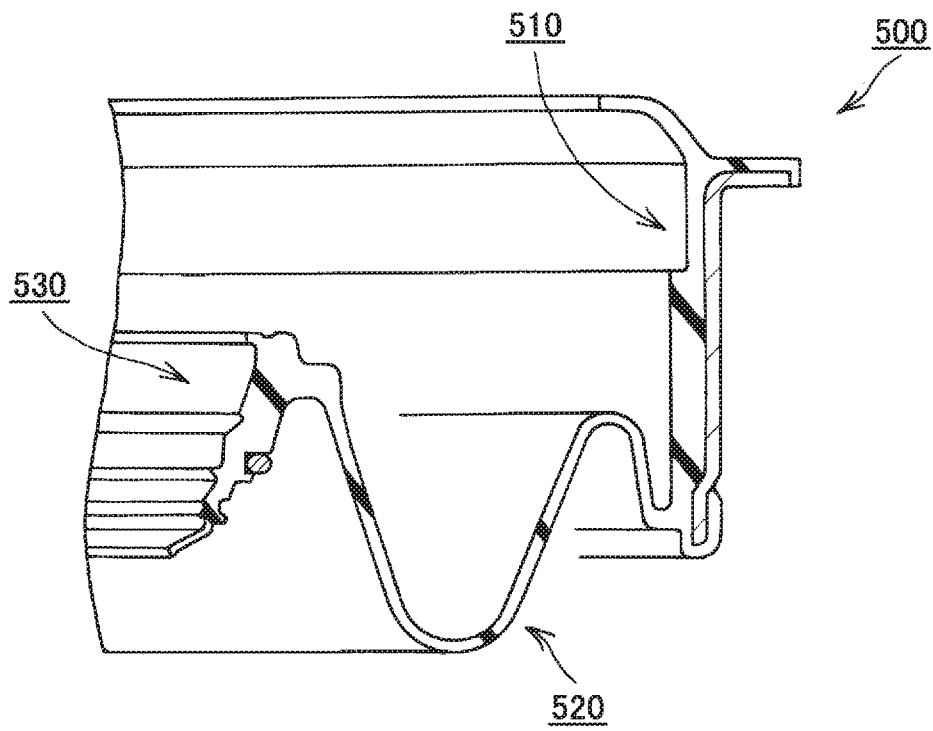
FIG. 7 is part of a schematic cross-sectional view of the sealing device according to a prior art example.

The bellows part 120 will be described in more detail with reference to FIG. 1 and FIG. 2 in particular. FIG. 2 shows part of a circumferentially cut cross-sectional view of the bellows part 120 of the sealing device 100 according to the embodiment. The bellows part 120 is provided to exhibit the ability to follow the shaft as the shaft deviates, in order to maintain the airtightness provided by the sealing part 130 even when the shaft 300 deviates. The bellows part 120 is thus formed to have a small thickness, and to extend from the fixed part 110 toward the shaft surface in a bellows shape. Therefore, the bellows part is intrinsically deformable easily not only in the radial direction but also in the circumferential direction due to low rigidity. As has been described in conjunction with the prior art example, the low rigidity in the circumferential direction could lead to cracks or splits of the bellows part 120 resulting from partial twisting when the shaft 300 deviates as it rotates. In this embodiment, the following configuration is adopted in order to minimize partial twisting of the bellows part 120.

The bellows part 120 according to this embodiment includes, on one side thereof, circumferentially alternating ridges 121 extending radially from outside to inside and grooves 122 extending radially from outside to inside. The bellows part 120 includes, on the other side, grooves 123 and ridges 124 that are exact backsides of the ridges 121 and grooves 122 on the one side of the bellows part 120, respectively.

The bellows part 120 is formed to have a substantially equal thickness t over the entire circumference. Namely, as shown in FIG. 2, the part where the ridges 121 and grooves 123 are formed, the part where the grooves 122 and ridges 124 are formed, and the part where joint parts 125 connecting the ridges 121 and grooves 122, and joint parts 126 connecting the grooves 123 and ridges 124 are formed, are all designed to have an equal thickness of t. The ridges 121 and the joint parts 125 of the ridges 121 and grooves 122 are connected via a curved surface. The grooves 122 and the joint parts 125 of the ridges 121 and grooves 122 are also connected via a curved surface. Similarly, the grooves 123 and the joint parts 126 of the grooves 123 and ridges 124 are connected via a curved surface. The ridges 124 and the joint parts 126 of the grooves 123 and ridges 124 are also connected via a curved surface. Various parts are connected via curved surfaces this way to minimize stress concentration.

In the sealing device 100 according to this embodiment, the ridges 121 and grooves 122 on one side, and the grooves 123 and ridges 124 on the other side, of the bellows part 120, all extend from the edge on the radially outer side to the edge on the radially inner side of the bellows part 120. The number and circumferential width of these ridges 121, grooves 122, grooves 123, and ridges 124 are not limited to particular values and may be suitably set in accordance with conditions of use. Various configurations can be adopted, including, for example, a bellows part 120a shown in FIG. 3, a bellows part 120b shown in FIG. 4, a bellows part 120c shown in FIG. 5, and a bellows part 120d shown in FIG. 6. FIG. 3 to FIG. 6 show perspective views of only the bellows part of the sealing device.

<Advantages of the Sealing Device According to This Embodiment>

Figure 8:
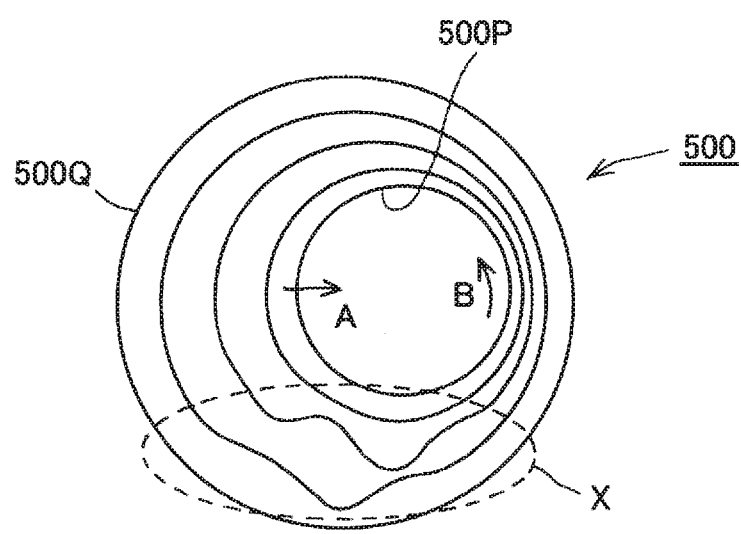
FIG. 8 is a schematic diagram of the sealing device viewed from an axial direction when the shaft deviates as it rotates.

The bellows part 120 of the sealing device 100 according to this embodiment includes ridges 121 and 124 and grooves 122 and 123 provided on one side and the other side thereof, respectively, to be corrugated in a bellows shape also in the circumferential direction. This gives the bellows part 120 according to this embodiment the easily expandable and contractible properties also in the circumferential direction. Therefore, partial twisting of the bellows part 120 can be minimized even when the shaft 300 deviates as it rotates. Namely, as has been shown in FIG. 8 referred to in the description of background art, it has been known that twisting occurs in an area of the bellows part located along a line orthogonal to the direction in which the shaft deviates. This is considered to be due to stress concentration in this area that is subjected to high tension in the circumferential direction. In the sealing device 100 according to this embodiment, as described above, such partial twisting of the bellows part 120 can be minimized since the bellows part 120 has easily expandable and contractible properties also in the circumferential direction. Moreover, the bellows part has a substantially equal thickness over the entire circumference, so that it does not suffer a local decrease in strength. Accordingly, local stress concentration in the bellows part can be minimized.

(Others)

In the embodiment described above, one example was shown where the ridges 121 and grooves 122 on one side, and the grooves 123 and ridges 124 on the other side, of the bellows part 120, all extend from the edge on the radially outer side to the edge on the radially inner side of the bellows part 120. In an alternative configuration, these ridges and grooves may be provided only in areas of the bellows part 120 where twisting can readily occur, and may not be provided where twisting hardly occurs.

In the embodiment described above, a steering dust seal was shown as one example of the sealing device, but the present disclosure is applicable to any sealing device in various equipment where a shaft rotates and deviates.

REFERENCE SIGNS LIST

100 Sealing device
110 Fixed part
111 Reinforcing ring
112 Outer circumferential elastic part
120, 120a, 120b, 120c, 120d Bellows part
121 Ridges
122 Grooves
123 Grooves
124 Ridges
130 Sealing part
131 Bumper
132 Lip
133 Fastening ring
200 Housing
300 Shaft
t Thickness

The invention claimed is:

1. A sealing device that seals an annular gap between a housing having a shaft hole, and a shaft configured to be inserted through the shaft hole and to rotate and deviate relative to the housing, the sealing device comprising:
    a fixed part fixed to an inner circumference of the shaft hole in the housing;
    a thin bellows part extending from the fixed part toward a surface of the shaft in a bellows shape; and
    a sealing part provided on a radially inner side of the bellows part and slidably contacting an outer circumferential surface of the shaft,
    the bellows part including,
    on one side thereof, circumferentially alternating ridges extending continually radially from outside at the fixed part to inside at the sealing part and grooves extending continually radially from outside at the fixed part to inside at the sealing part, and
    on the other side, grooves and ridges that are exact backsides of the ridges and grooves on the one side of the bellows part, respectively, and
    the bellows part being formed to have a substantially equal thickness over an entire circumference thereof.

* * * * *